US011900780B2

(12) United States Patent
Worecki (10) Patent No.: US 11,900,780 B2
(45) Date of Patent: Feb. 13, 2024

(54) METHOD AND SYSTEM FOR MONITORING COURSE OF WORK

(71) Applicant: INNERWEB SPÓŁKA Z OGRANICZONĄ ODPOWIEDZIALNOŚCIĄ, Śląskie (PL)

(72) Inventor: Marcin Worecki, Bielsko-Biala (PL)

(73) Assignee: INNERWEB SPOLKA Z OGRANICZONA ODPOWIEDZIALNOSCIA, Bielsko-Biala (PL)

( * ) Notice: Subject to any disclaimer, the term of this patent is extended or adjusted under 35 U.S.C. 154(b) by 120 days.

(21) Appl. No.: 17/610,427

(22) PCT Filed: May 12, 2020

(86) PCT No.: PCT/EP2020/063241
§ 371 (c)(1),
(2) Date: Nov. 10, 2021

(87) PCT Pub. No.: WO2020/229498
PCT Pub. Date: Nov. 19, 2020

(65) Prior Publication Data
US 2022/0246013 A1 Aug. 4, 2022

(30) Foreign Application Priority Data
May 13, 2019 (EP) .................... 19461538

(51) Int. Cl.
*G06Q 10/00* (2023.01)
*G08B 21/02* (2006.01)
(Continued)

(52) U.S. Cl.
CPC ....... *G08B 21/0261* (2013.01); *G06Q 30/018* (2013.01); *G08B 21/0272* (2013.01); *G08B 21/0277* (2013.01); *G08B 25/10* (2013.01)

(58) Field of Classification Search
CPC ............ G08B 21/0261; G08B 21/0272; G08B 21/0277; G08B 25/10; G08B 25/08;
(Continued)

(56) References Cited

U.S. PATENT DOCUMENTS

2005/0070309 A1* 3/2005 Caspi .................... H04W 4/029
455/456.5
2018/0108236 A1* 4/2018 Kanukurthy ........... A62B 9/006

FOREIGN PATENT DOCUMENTS

EP          3739529 A1    11/2020
WO       2020229498 A1    11/2020

OTHER PUBLICATIONS

Chevron (retrieved at https://www.chevronwithtechron.com/content/dam/external/chevron/en_us/marketing-support/all-other/2017MC_Hot_Work_Remote_Permit.pdf) (Year: 2017).*
(Continued)

*Primary Examiner* — Gabrielle A McCormick
(74) *Attorney, Agent, or Firm* — The Concept Law Group, PA; Scott D. Smiley; Scott M. Garrett (57) ABSTRACT

A method, a system and computer program product for monitoring, especially pre-fire monitoring, a course of work in a specific location of work within a facility using at least one radio beacon (IB, IB1, IB2, IB3) used to send signals to at least one mobile device (UE1, UE2, UE3) connected to a server (S) via a communication network (N) according to the invention involves placing said at least one radio beacon (IB, IB1, IB2, IB3) near the location of work.

11 Claims, 7 Drawing Sheets

(51) Int. Cl.
*G06Q 30/018* (2023.01)
*G08B 25/10* (2006.01)

(58) Field of Classification Search
CPC .. G08B 21/22; G08B 21/0225; G06Q 30/018; G06Q 10/0639; G06Q 10/10; G06Q 50/08; H04W 4/021
See application file for complete search history.

(56) References Cited

OTHER PUBLICATIONS

World Intellectual Property Organization, International Search Report and Written Opinion for international application No. PCT/EP2020/063241, dated Jun. 29, 2020, 12 total pages.

* cited by examiner

HOT WORK BY
- ☐ Employee
- ☐ Contractor ______________

| DATE | JOB NUMBER |
|---|---|
|  |  |

LOCATION OF WORK (BUILDING/FLOOR/OBJECT)

WORK TO BE PERFORMED

NAME OF PERSON PERFORMING HOT WORK

NAME OF PERSON PERFORMING FIRE WATCH

I verify the above location has been examined, the Required Precautions have been taken, and permission is authorized for this work.

PERMIT AUTHORIZER (PRINT AND SIGN)

THIS PERMIT EXPIRES ON (LIMIT AUTHORIZATION TO ONE SHIFT):

DATE:          TIME:          AM/PM

Fig. 1 [state of the art]

METHOD AND SYSTEM FOR MONITORING COURSE OF WORK

RELATED APPLICATION INFORMATION

This patent claims priority from International PCT Patent Application No. PCT/EP2020/063241, filed May 12, 2020 entitled, "METHOD AND SYSTEM FOR MONITORING COURSE OF WORK", which claims priority to European Patent Application No. 19461538.1, filed May 13, 2019, now European Patent No.: EP3739529A1 issued Nov. 18, 2020 all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

The invention concerns a method and a system for monitoring of work at a specific location in a facility. The invention is related, in particular, to monitoring a course of work where a risk of fire exists—so called pre-fire monitoring.

European patent publication EP0155032 discloses a device for monitoring of presence of an individual within a pre-defined area and a method of use of such a device, in which the monitored individual wears an electromagnetic wave transmitter provided with a battery and a clock device activating the transmitter after a specified time.

American patent publication U.S. Pat. No. 8,810,392 discloses a device and a method for monitoring presence of items and generating alarms if absence is detected. In this method, the context of user is specified and utilized to determine a proximity framework between the monitoring device and one or more items. The proximity framework includes one or more proximity requirements between the monitoring device and an item, as well as a notification process corresponding to this proximity requirement. Then, proximity of the item and of the monitoring device is monitored on the basis of a signal from a radio transmitter placed on the item, in order to determine whether proximity criteria are met. The relevant notification process is initiated if proximity requirements are not met.

Publication of international patent application WO2017030799 discloses a device for monitoring presence of people within a ticket control area and granting access to authorised individuals. A mobile device receives a radio signal from a beacon in Bluetooth standard. This signal is used to determine whether the device is located within the ticket control area and the respective signal is sent to an external unit, also using the Bluetooth interface. This signal is used to determine whether user holds a valid ticket and opens (or does not open) a gate. This solution ensures higher throughput of ticket control systems. Publication of US patent application no US2018108236 discloses a method and system for monitoring course of work at a specified location of work including at least one radio beacon and a mobile device connected to a server using a communication network. The system is adapted to send message that includes context data to a personal protection equipment management system PPEMS and to monitor location of the worker and generate alarm according to safety rules.

Figure 1:
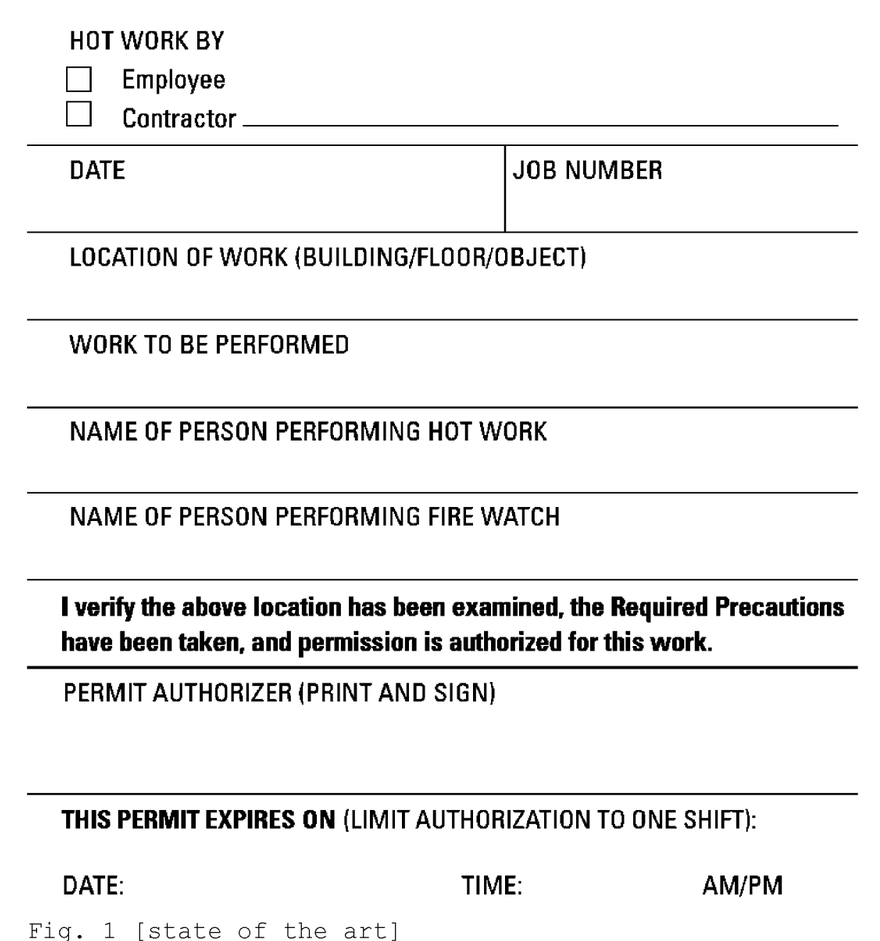
FIG. 1 presents a state of the art set of data required in a work permit in the field of the invention.

Work with potential risk of fire, executed at industrial facilities by external contractors, are subjected to strict monitoring. Work permit circulation and supervision harmonisation thereof usually use the traditional, paper-based form. An example set of data required to issue a work permit is presented in FIG. 1. It includes: identity of the person performing the work, identity of the person monitoring (fire watch) the work, date, identifier of work (job number), location of work, scope and time of work, date and time at which the work is started.

No automated solution is available in the field, which would minimise the risk of an accident related to execution of work by external contractors and internal organisation units, in addition to access monitoring and granting.

SUMMARY

The objective of the invention is to provide a method for monitoring of a course of work and a system for monitoring of a course of work enabling control and ensuring increased safety levels, in particular minimizing fire risk In a method of monitoring of course of work at a specific location of work in a facility involving at least one radio beacon used to send a signal to at least one mobile device connected to a server via a communication network, according to the invention said at least one radio beacon is installed near the location of work. The method includes a step of sending a work start request signal by a first mobile device, including indication of the identity of a worker qualified work requiring use of fire, carrying the first mobile device, identity indication of at least one other worker carrying a second mobile device, identification of work including the start and end time of work, identification of location of work. The method also includes the next step of processing the request by the server and granting an e-permit if request is complete and at least one individual performing work meets requirements for work with fire, or refusing e-permit and terminating the procedure. If the e-permit is granted, server sends an permit to start of work to the mobile device. The method also includes an identification step of the location of work by mobile device on basis of a signal from one of the radio beacons. The method also includes a step of real-time monitoring of course of work by mobile device, including periodic determination of the position status of the mobile device against the location of work and sending the result to the server, as well as generation of a first alarm by the server by applying measures selected from a group including: push notifications sent to mobile devices SMS gate messages, voice calls to mobile devices, e-mail messages and triggering signaling devices, if a first criterion based on position status of mobile device with respect to the location of work is met during the time between the start and the end of work. Method includes a step of surveilling of the location of work after completion of work, by mobile device for predetermined surveillance time of at least 60 minutes, and second alarm generation by the server by applying measures selected from a group including: push notifications sent to mobile devices UE1, UE2, UE3, SMS gate messages, voice calls to mobile devices, e-mail messages and triggering signaling devices if during the specified surveillance time after the end of work a second criterion based on the position status of the mobile devices with respect to the location of work is met including verification if all devices are absent.

The position status preferably has one of at least three values representing respectively "presence", "moved away" and "left" with respect to the location of work. In some cases it is advantageous to use more than free statuses e.g. "off-line" representing device not responding.

The position status is preferably determined on the basis of a power of the signal received from the radio beacon.

The position status is alternatively determined on the basis of distance-based radio navigation, using at least two beacons. The use of only two radio beacons in distance-based radio navigation requires additional information to determine the location, as the system of equations of distance-based navigation includes at least two solutions in such a case. Such information may be provided as the initial position of the mobile device obtained using a different method.

The alarm signal preferably includes a message sent from the server to the mobile device.

A unique graphical code with an encoded location of work is preferably provided at the location of work and scanned using the mobile device, thus identifying the location of work.

Advantageously e-permit request triggers a processes at the server including, before granting an e-permit verification step for checking whether the identification of the location of work is related to hazardous equipment with supply protection, protection verification step to check whether remote protection system is available; then blocking possibility of restoring protected supply by sending a signal from server if remote protection is available; and finally verification if supplies are disconnected and sending readiness notification signal.

The required surveillance time after completion of work is preferably encoded in the signal requesting permission for starting work.

According to the invention, the system for monitoring of course of work in a facility to minimize risk of fire, including a server and at least one mobile device connected to the server via a communication network and at least one radio beacon generating signal detectable by the a first mobile device and a second mobile device. The system includes devices generating sound and light alarms, connected to the server via the communication network and is configured to execute the method according to the invention.

The system preferably includes at least two mobile devices.

The system preferably includes at least two radio beacons, and in particular, a set of beacons placed in the industrial facility, near equipment covered by the performed work.

The system preferably includes graphical codes located throughout the facility, with a coded identifier of their location in the facility.

The system preferably includes devices generating sound and light alarms, connected to the server via a communication network.

The computer program product adapted to installation on a mobile device provided with a radio interface connected to a telecommunication network and with a radio interface adapted to—loaded into memory of the mobile device—receiving signals from radio beacons, according to invention is adapted to identify the location of work where the mobile device is present, to sending a signal requesting a work start using the telecommunication network, including an indication of the identity of the worker, identification of work, including the start and end time of work, identification of the location of work, periodic determination of the position status of the mobile device against the location of work on the basis of signals from radio beacons and to sending the result using the telecommunication network and to receive the alarm signal via the communication network.

DESCRIPTION OF THE DRAWINGS

The invention is described in more detail below with reference to its embodiments presented in the attached drawings, in which:

FIG. 4 presents a block diagram of a system according to the second embodiment of the invention, while

DETAILED DESCRIPTION

Figure 2A:
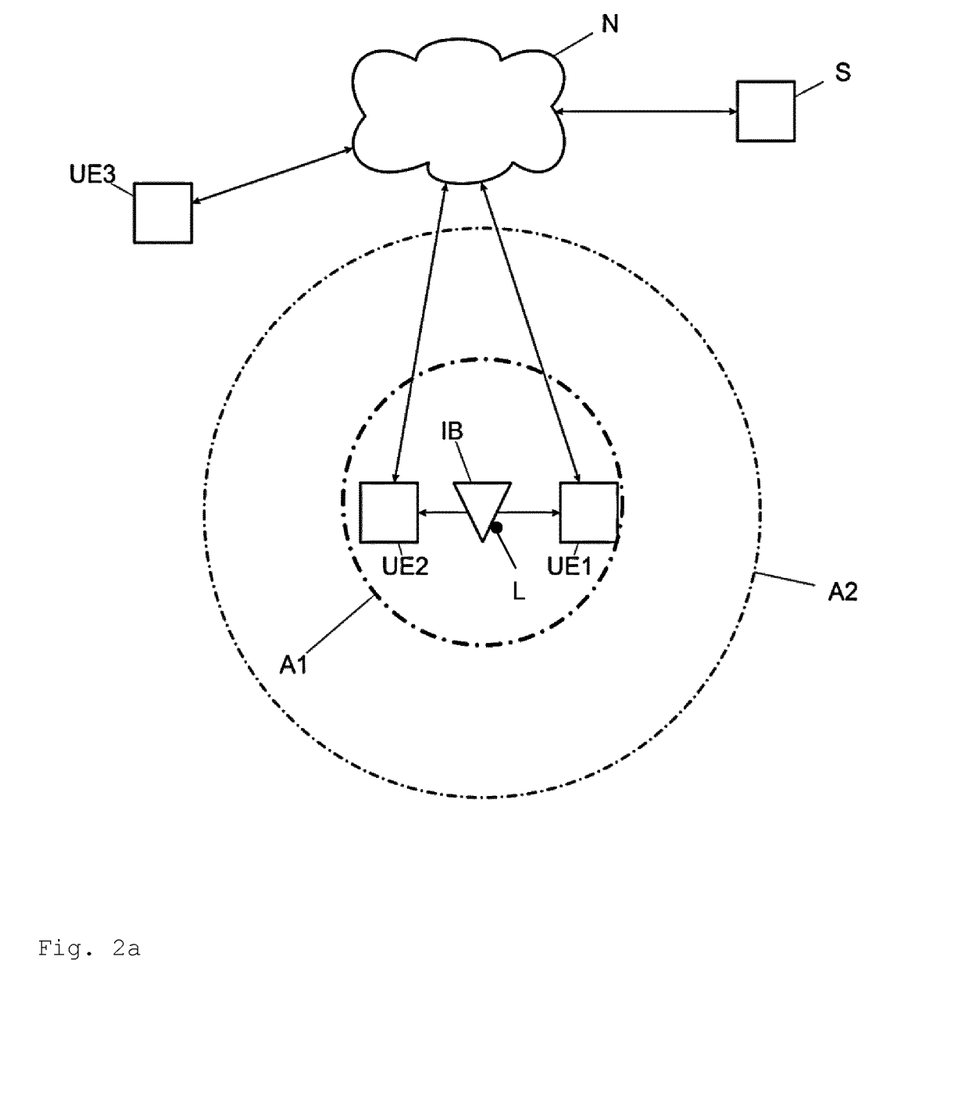
FIGS. 2a, 2b and 2c present a block diagram of a system according to the first embodiment of the invention with the mobile device in individual areas.
Figure 2B:
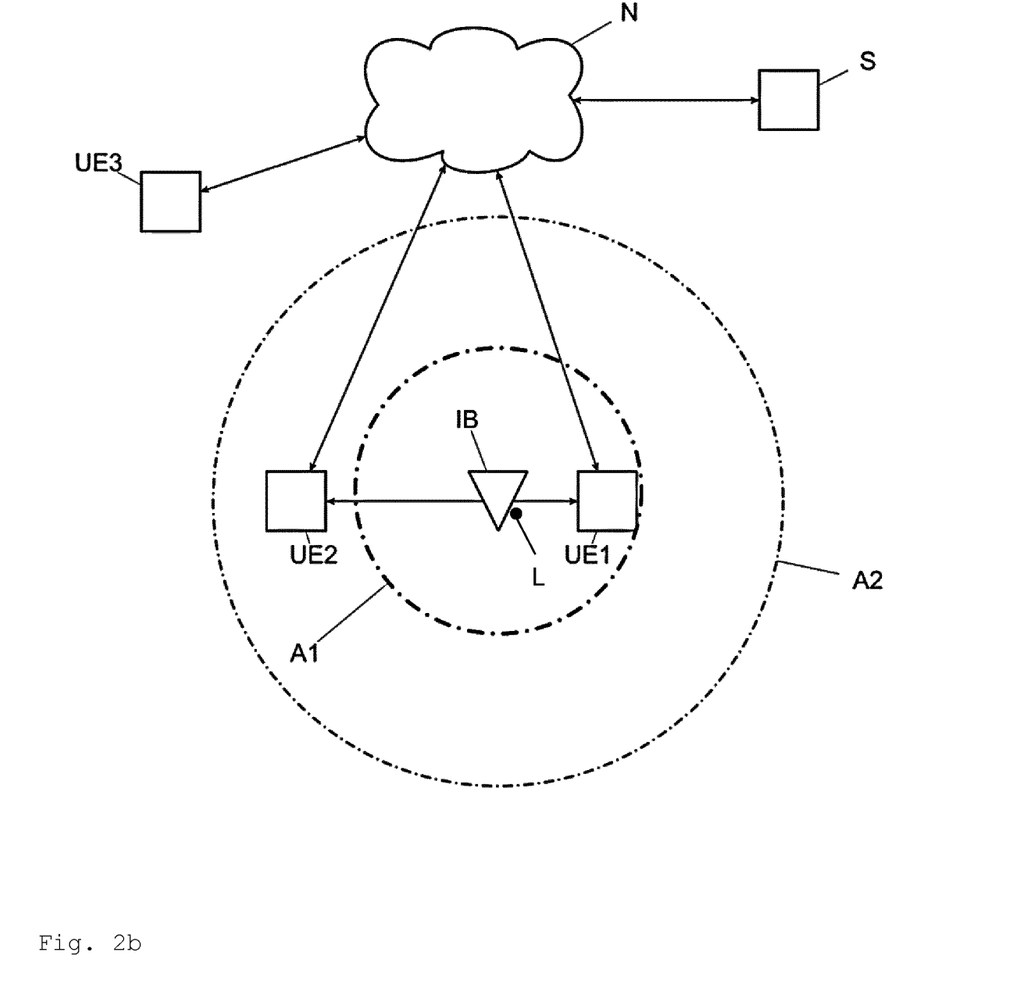
Figure 2C:
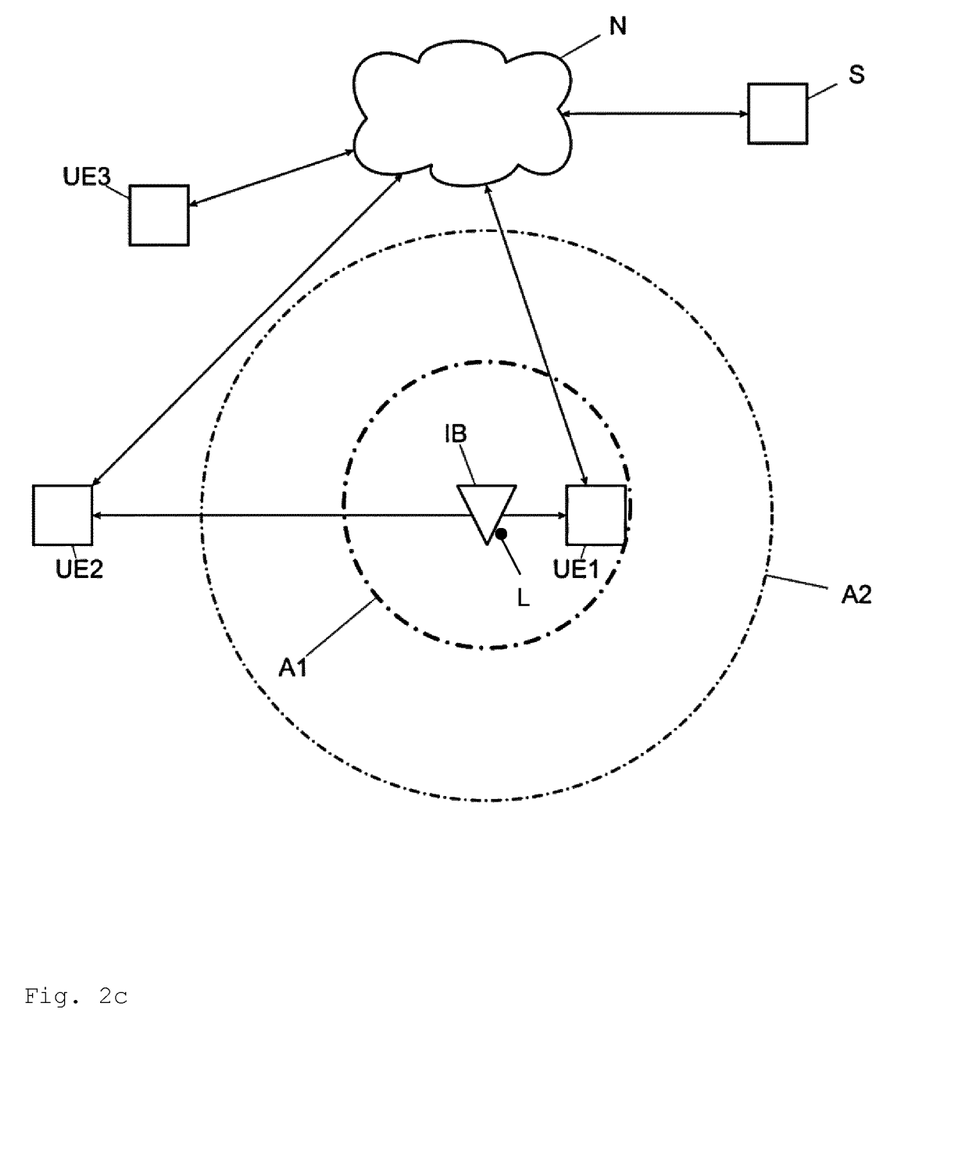

A block diagram of a system for monitoring of work at a side according to the invention, in the first embodiment of the invention, is presented in FIGS. 2a, 2b and 2c. The system includes a server S and mobile devices connected to the server via a communication network N, namely the first mobile device UE1, the second mobile device UE2 and the third mobile device UE3 device provided with LTE modems and with a Bluetooth interface. The system also includes a radio beacon IB generating a radio signal using the Bluetooth Low Energy standard, detectable by the mobile devices. iBeacon operating at the frequency of 2.4 GHz is an example of such a device. The communication network N is an LTE standard network. The signal sent by the radio beacon IB in this embodiment of the invention has three main parameters, one fixed UUID and two fields identifying the monitored facility and the location of the radio beacon within the facility. Such a solution enables centralised management of systems at various locations.

The radio beacon is placed at the location of work L, for example, on a machine which requires welding, cutting or other work with increased risk of fire to be repaired. The location of work L is in direct proximity of the radio beacon IB. Additionally, a graphical 2D code may be assigned to the radio beacon, which enables the UE1, UE2, UE3 mobile device identifier to be read and sent to the server. This may be a QR code (Quick Response) or a DMC code (Data Matrix Code). This solution guarantees access to initial coordinates and provides proven identity of the actual location of work with the location specified in the request and in the e-permit.

The mobile device is considered to be present at the location of work L—the "present" status, if it is found within 12 m from the location of work L on the basis of a signal from at least one radio beacon IB—within the first area A1. The size of the first area is set according to the type of performed work. In the case of work on metal—welding and cutting, statistical analyses show that such activities usually take place within a 8-15 m radius. This area coincides with the typical safety margin—the radius within which sparks may fall—11 m. FIG. 2a presents the first mobile device UE1 and the second mobile device UE2 located within the first area A1.

Typical mobile devices in sleep mode process Bluetooth signals every several seconds—usually between 9 and 45 seconds. Excessively frequent signal processing causes the battery to discharge more quickly. Infrequent signal processing increases the risk. Signal processing at 30 s intervals is used in this example. This means that the use of such signals does not allow high frequency of position sampling. Thus, if no signal is received from the radio beacon IB, the application finds it difficult to determine whether the location of work L was "left", or whether the equipment malfunctioned, discharged or lost connection. This problem may be partially solved by introducing the "moved away" position status.

Mobile devices UE1, UE2, UE3 may include devices such as smartphones, smartwatches, tablet PCs and other devices able to receive BLE signals and to send processed information using an application running on the mobile device, via network N, to the server S. The application installed on the mobile device requires the worker to register in order to be able to apply for an e-permit.

The server S receives information from mobile devices and ensures the ability to generate alarm signals using technical measures such as: push notifications sent to mobile devices UE1, UE2, UE3, SMS gate messages, voice calls to mobile devices, e-mail messages and triggering signaling devices.

The signaling device alerts about a hazard at the location of work visually and/or audible and is able to receive wirelessly information from the server, directly or indirectly.

The mobile device is considered to be moved away from the location of work—the "moved away" status, if analysis of a signal from at least one radio beacon IB indicates that the mobile device it is located outside the first area A1, but within 30-90 m from the location of work L. This is the second area A2. In this case, the second area has the radius of 60 m. FIG. 2B shows the second mobile device UE2 located in this area.

Devices located outside the second area A2 are assigned the "left" status. FIG. 2C presents mobile devices UE2 and UE3 located outside the second area. If the system detects a "present"→"moved away"→"left" sequence, presented for the UE2 mobile device, respectively, in FIG. 2a, 2b 2c, it is known that the worker left the location of work L and is absent. An undetected device does not ensure such a certain detection and assuming "absence" at the location of work results in a false alarm risk. High frequency of false alarms may create bad habits of ignoring alarms in the users, leading to an increased risk of fire. In some cases it is advantageous to use more than free statuses e.g. "off-line" representing device not responding. This status is used for devices that are not responding for a time justifying assumption that person carrying the device is for some reasons (e.g., medical) of duty. Naturally it is possible to introduce more statuses to address other specific circumstances.

A worker is a person performing activities at a location of work, with appropriate authorizations. A worker may be identified by their assigned authorizations, i.e., a set of worker skills confirmed with an examination passed before an appropriate examination body.

An e-permit is an electronic document, containing: location of work, data of workers performing activities, data related to the performed work, data of the work supervisor, approvals of all authorised individuals, a list of all particularly hazardous work performed, a certified verification and inspection performed by designated individuals.

The mobile device UE1 connects to the server using an application and sends an e-permit request as a notification signal of a demand for work requiring fire use. The request indicates the identity of the working individual—the UE1 mobile device user. This is a qualified person. Additionally—optionally, additional working individuals may be indicated. Identification of an unqualified working individual may also be included, allowing their mobile device UE2 to be assigned to work. The request also includes identification of work containing the start and end times of work and identification of the location of work.

The mobile device initially performs identification 300 of the location of work. The identification is performed on the basis of signal from the nearest radio beacon IB. Actions performed according to the invention are illustrated in an action network presented in FIG. 3.

Figure 3:
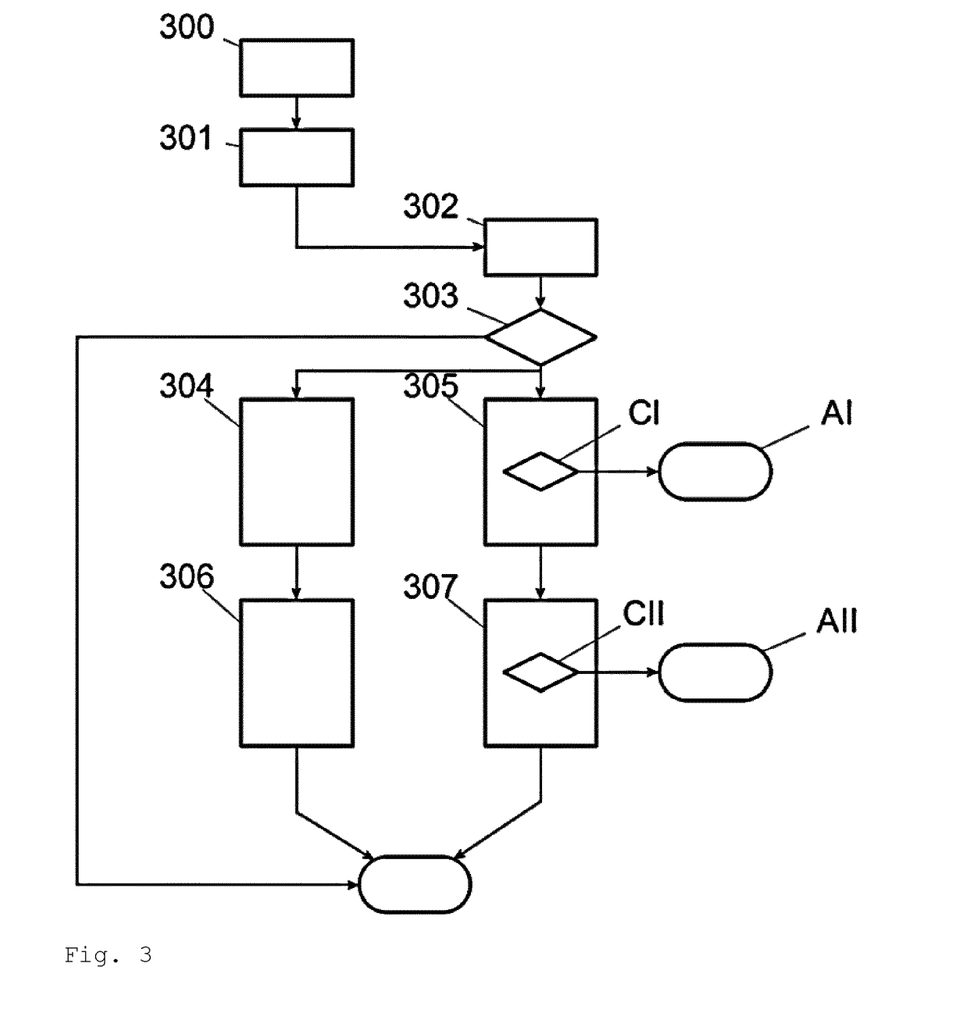
FIG. 3 presents a network of actions according to an embodiment of the invention.

The server is adapted to generate a response to the work request 301. The request is processed by the server during step 302. In this case, the e-permit is granted if data in the request is complete and qualifications of at least one individual performing work meet the requirements for work using fire. Otherwise the e-permit is refused and the procedure ends. In this case the UE1 device owner is a person with such qualifications.

During the processing step 302, criteria CI and CII of alarm generation during work monitoring and surveillance are selected on the basis of data included in the e-permit.

Once the permit is granted, work 304 begin and the system monitors 305 the work. If a "moved away" followed by "left" of the location of work by the mobile device UE1 is detected, an alarm is generated.

Studies show that a statistical person are strongly against entrusting their mobile devices to others, thus the user of the mobile device UE1 is motivated not to entrust it to the workers when moving away.

Alternatively, presence of at least two people from the working team is used as the first criterion. This reduces the risk of accidents.

The location of work requires surveillance once the end of work is signalled. Presence of a qualified individual or multiple individuals is not required, this may be the UE2 person. The alarm criterion is provided as a detection W of a "moved away" status, followed by loss of position data, alarms are also generated if "left" of the location of work by the mobile devices UE1 and UE2 is detected. An alarm is also generated if both devices are outside the network range. At the end of work, circumstances resulting in the loss of signal, such as entering a machine or an atypical body posture screening the mobile device occur far less often.

In the case of work with fire, the surveillance time is in the range between 45 and 90 min—usually 60 min. Surveillance over such a period of time allows the risk of accidentally starting a fire to be significantly reduced. In certain circumstances specifically in non-filmable facilities 30 minutes is enough—more is better. Nevertheless, experiments show that in most cases 45 min is a safe minimum. The surveillance period is referred to as fire watch period In some situations and in some facilities, it is justified to implement a second surveillance period—which may take place when in "moved away". Such additional surveillance should last between 120 and 240 min. This second surveillance period can be executed by a different person—even not qualified. It mostly consists in being able to react early to any possible fire occurrence. Early detected fire can be easily extinguished by such person.

The required surveillance time may be optionally indicated for a typical work in the e-permit request. The e-permit request may indicate the location of work using the identifier of a device on which the work is performed or the facility plan. Then, once the e-permit is granted, the identification step 300 of the location of work takes place using the mobile device UE1 on the basis of radio signal of the radio beacon IB or by readout of a graphical code at the location of work.

The e-permit request may be alternatively sent from a mobile device located in the facility. Then, the identification step 300 of the location of work takes place before the step 301 of sending the signal of a work start request (an e-permit request). This execution is preferred because of the fact that it excludes granting e-permits if surveillance is impossible due to a radio beacon fault.

In another embodiment of the system presented in FIGS. 2a-c, the distance is evaluated on the basis of signal power. This is a relatively unreliable method, particularly in a distracting, industrial environment. Significantly better results may be achieved using multiple radio beacons IB1, IB2, IB3. Then, the application running on a mobile device determines the position of the mobile device it is running on using remote radio navigation methods known in the art. A block diagram of such a system is presented in FIG. 4.

Figure 4:
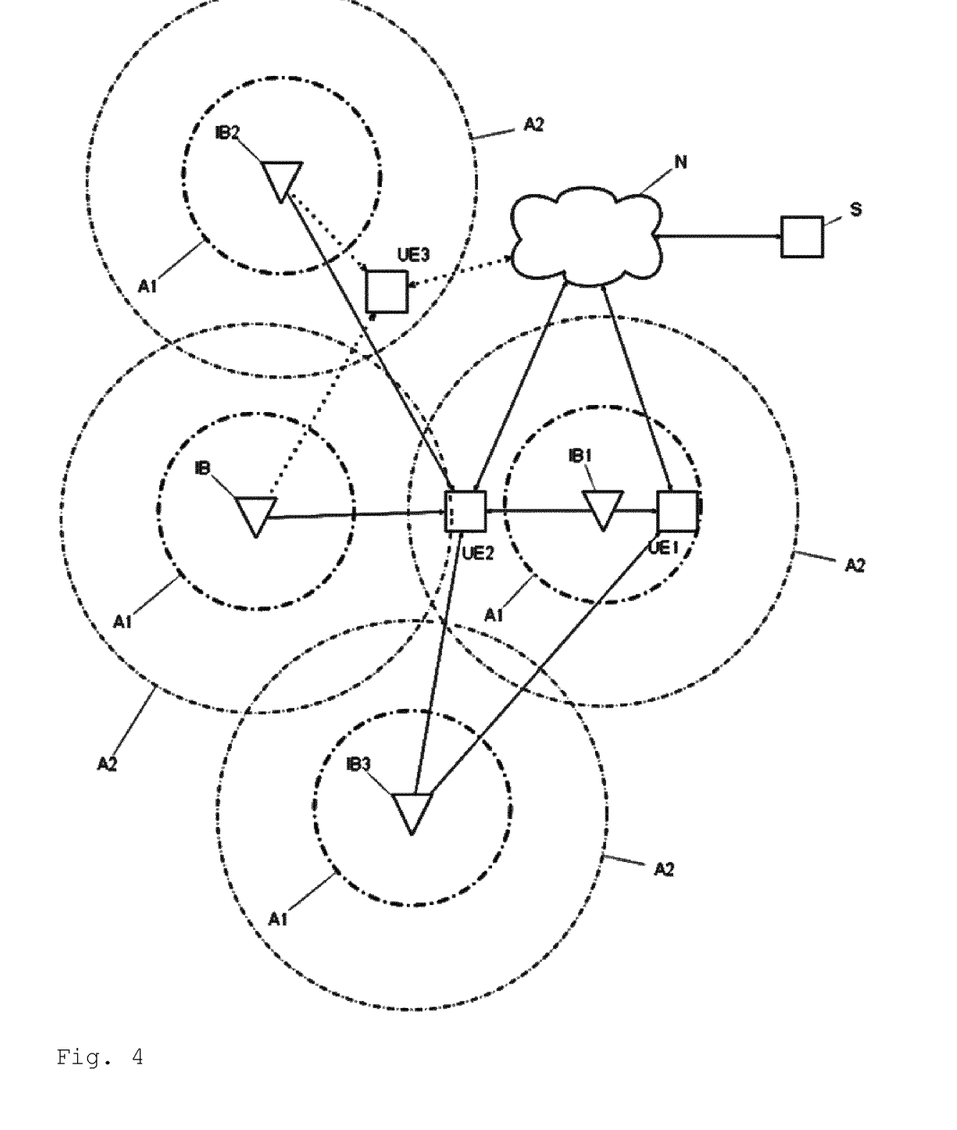

Radio beacons IB1, IB2, IB3 are placed around the facility. FIG. 4 presents 3 such beacons as a simplification, but in the case of typical industrial facilities more beacons should be used, selecting their number and layout using known techniques in order to ensure signal coverage throughout the entire facility, preferably meeting the conditions stating that the mobile device receives signals from at least three radio beacons IB1, IB2, IB3 at any location in the facility.

Radio beacons should also be located such that they are close to usual work locations, such that signal from one radio beacon dominates at the locations of work. The initial position may be easily read using the device in such situations. Experiments showed that in most configurations, if the radio beacon IB is placed at equipment on which work is performed, signal corresponding to a distance of 3 m or smaller from such a radio beacon may be considered as adequate to conclude that the location of work is located near the beacon.

Additionally, a graphical 2D code may be assigned to the location of work, which enables the UE1, UE2, UE3 mobile device identifier to be read and sent to the server. This may be a QR code (Quick Response) or a DMC code (Data Matrix Code). The identifier may be used to read the previously stored coordinates and thus to determine the location of work even if unfavorable propagation conditions make radio navigation using radio beacons difficult.

The system, the method and the computer program product according to the invention may also be used to increase the safety level and to limit risk related to maintenance of industrial machinery.

Accidents during maintenance of industrial machinery occur not only as a result of starting fire, but also, and even in particular, as a result of having the machinery switched on during work—by accident or if the actual work time exceeds the time assumed and indicated in the e-permit.

Adaptation of the invention to this scenario requires the e-permit processing to be expanded using additional processes. One of such processes includes an example presented as an action network in FIG. 5. One of the factors behind approving e-permit opening includes verification whether the location of work is secured using the LOTO (Lock Out Tag Out) system according to American standards no. 1910.147.

Figure 5:
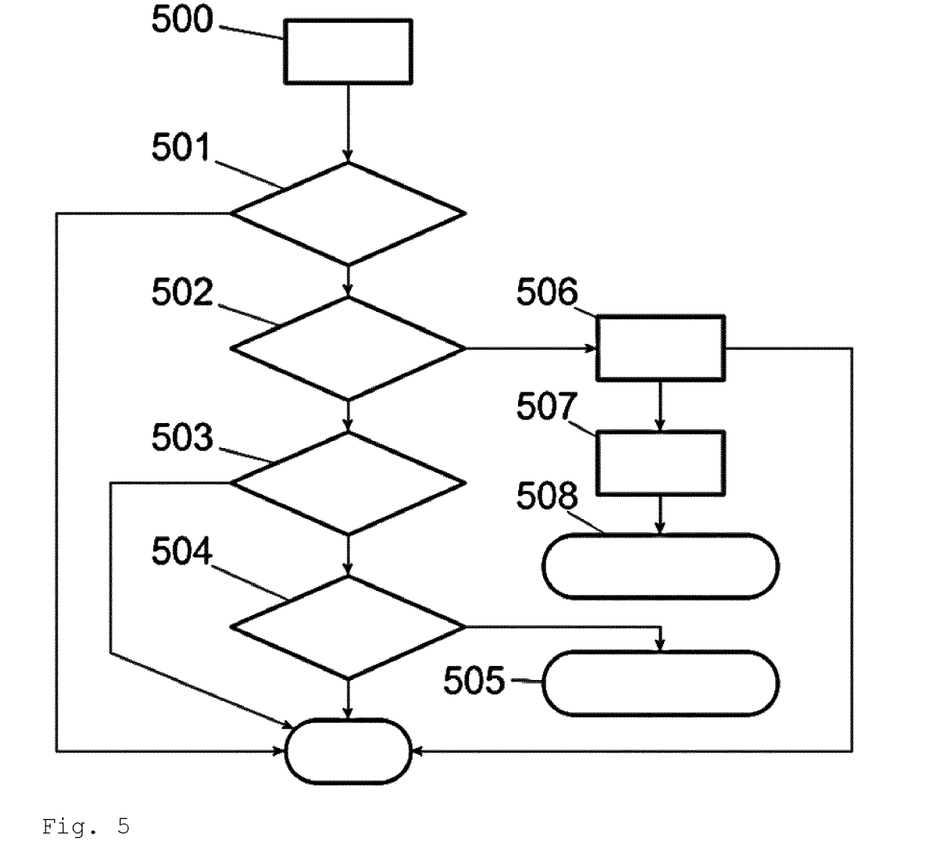
FIG. 5 presents a network of actions for an additional process in another embodiment of the invention.

The e-permit request 500 triggers processes related to request processing 302 at the server S. At the same time, verification step 501 takes place at the server, checking whether the identification of the location of work is related to a machine or to another hazardous equipment provided with utilities, such as power supply, compressed air, water, emulsion, oil and similar media. This is followed by a LOTO protection verification step 502 which checks, whether the applied LOTO protection method includes padlocks with a normal key or whether the location of work is provided with a remote LOTO protection system, including an electronic key. The electronic key may be one of the mobile devices UE1, registered with the server and assigned to one specific individual. In the case of the electronic "key", control signal sent by the server is used to lock out the ability of restoring power supply and provision of other utilities to the machinery using elements selected from a group including wireless Bluetooth padlocks, wirelessly controlled electric valves and wirelessly controlled power supply disconnectors able to communicate with the mobile device UE1. This is followed by a power down verification step 503, in which it is checked if the machine on which work is performed is disconnected from the power supply and by a valve status verification step 504, in which it is checked whether all utility-supplying valves are cut off from the machine. Then, the server performs a step 505 of sending readiness notification signal, which indicates that the location is LOTO-secured electronically and grants an e-permit if all other conditions are met.

The surveillance of work using the server software includes not only monitoring of mobile device presence, but also of the presence of padlocks on installations and the presence of voltage at the electric cabinet during work. If power supply is restored or if protection fault is discovered, an alarm indicating violation of the LOTO barrier is sent. At the end of work, once protective measures are removed and the location of work is verified, qualified staff may remove the electronic lock of protections and close the e-permit.

If a standard key is used, the system sends 506 a request for verification by an authorised individual equipped with the mobile device UE2, which should visually check whether the location of work is prepared for work. The system checks 507 whether the verifying individual has the "presence" status at the location of verified work. The presence check based on the distance from the location of work/verified location of work is a key element of system operation. If LOTO protection measures provided as standard padlocks are approved for all utilities and for the power supply of the machine and the "presence" requirement is met for the mobile device UE2 by the verifying individual, a LOTO protection confirmation 508 is sent for the location of work.

Standard padlocks exclude continuous surveillance of LOTO presence at the location of work—the verifying individual is responsible for such verifications. A so called LOTO box is located at the location of work, provided as a metal sheet box containing all padlock keys for utilities of the given machine at the location of work dropped through a slit. There may be e.g. 5 such key: electric power supply cabinet key, compressed air key, water key, emulsion key and oil key. The LOTO box is provided with its own LOTO padlock, locked by the verifying individual, thus ensuring safety and preventing access to the interior of the box and unlocking the protective measures. Staff working at the location of work attach themselves to the LOTO box, which is provided with multiple openings in its housing, and additionally increase their own safety levels before the box is opened. At the end of the work, all staff members leave the location of work and remove their padlocks from the LOTO box. The verifying individual finally opens the box and may unlock the machine, thus closing the e-permit. E-permit closing requires a presence verification and a confirmation stating that the staff has finished working.

In this embodiment of the invention, the alarm generation criterion may also be provided as the status of monitored equipment using server software. The ability to switch utility supplies to the machinery on manually, without the need to rely on the server, may even be eliminated completely.

Application of the invention in monitoring of work related to risk of fire largely eliminates the most frequent causes of fire, present in the group classified in the study as "Recklessness of adults during fire hazard work", in particular, incorrect welding and lack of proper welding surveillance, or work performed using fire near flammable materials.

The invention enables this to be achieved through surveillance of the distance of qualified individuals from the location of work in order to ensure their presence during work.

The invention also enables surveillance of a presence of the supervisor during surveillance of the location of work. The system according to the invention triggers an alarm informing the staff and individuals located near the location of work if all staff members moved away from the location of work before closing, and about a possible fire hazard at the location of work left unsupervised. Fire caused by a spark generated during work using fire may be delayed, thus fire hazard work require continuous monitoring during the work, as well as surveillance of the location of work once such work are completed.

The method according to the invention is adapted to implementation using typical and easily available mobile devices—telephones, smartphones, tablet PC or even portable computers, equipped with a display, a data input interface, radio interfaces and in the case of preferable embodiments of the invention—with a camera.

Activities performed using a mobile devices are easily automated by providing an application—a computer program product loaded to the memory of the mobile device, used to identify 300 the location of work, where the mobile device is located, on the basis of signals from radio beacons IB, IB1, IB2, IB3 and/or additional information about the location included in a graphical code scanned using a photo camera built-in into the mobile device. The computer program product loaded to the memory of the device uses a telecommunication network to which the mobile device is connected to send the work request signal, including indication of the identity of the worker in the form of their name and surname, identifier or other unique information, identification of work, including the foreseen start and end time of work, identification of the location of work—as coordinates or as an identifier of the machine/facility where the work are performed. The computer program product is adapted to checking the position status of the mobile device periodically using the mobile device, in relation to the location of work, on the basis of signals received from the radio beacons and sending the result using the telecommunication network, and to receiving alarm signals via the communication network.

The computer program product is particularly adapted to receiving alarm signal specifying the location from the server S. Such a signal is sent, if the device remains outside the range of radio beacon signals for a pre-defined time. The mobile device then generates an alarm signal and the display presents a request to scan the graphical code located at the location of such work. Periodic refreshing of such a request enables presence to be monitored even if radio equipment malfunctions.

The use of radio beacons in the Bluetooth Low Energy (BLE) standard enables excessive power consumption of mobile devices to be limited, at the same time enabling easy compatibility with typically used mobile devices.

The communication network may be provided as a wired or a radio communication network. IP protocol network are particularly useful. In the case of radio network, the communication network may be provided as a cell network, in particular a 3G or an LTE network, or as an IEEE 802.11 (Wi-Fi) standard network. Ad-hoc network based on the Bluetooth or on the NFC standard are also permitted. LTE and IEEE 802.11a are particularly useful because of their use of orthogonal frequency-division multiplexing (OFDM) ensuring resistance to multi-path losses common in industrial environments because of the large numbers of reflecting objects.

Person skilled in the art will further easily recognise that configuration of the system in which mobile device determines its position with respect to the beacon transmitting positioning system has certain advantages over the configuration in which mobile device transmits signal which received by multiple receivers is used to determine position. Overall noise in said configuration does not depend on the number of mobile devices and mobile devices do not interfere with each other. Further it is still possible to program mobile device to display warning to the user who leaves place of work unobserved even if connectivity to the server is lost.

It is claimed:

1. A method for monitoring course of work at a specified location of work (L) for minimizing fire risk in a facility, the method comprising:
    providing, at a location proximate to a location of work, at least one radio beacon, the at least one radio beacon repetitively transmitting a radio signal including an identifier of the at least one beacon and a coordinate location of the at least one beacon;
    providing a first mobile device and a second mobile device, the first mobile device being associated with a first worker who is qualified to perform work using fire, the second mobile device being associated with a second worker, both the first and second mobile device being configured to receive the radio signal transmitted by the radio beacon, and wherein the first and second mobile devices are in communication with a server via a communication network;
    sending (301), by the first mobile device (UE1) to the server, a request for an e-permit for starting work, the request including
        an identity indication of the first worker,
        an identity indication of the second worker,
        an identification of work, including
            start and end times of the work,
            identification of the location of work, based on the location of the radio beacon as indicated in the signal transmitted by the radio beacon and received by the first mobile device,
    the server processing (302) the request and granting the e-permit, when the request is complete and the server verifies the first worker meets requirements for work with fire based on the identity indication of the first work in the request,
    and, when the e-permit is granted,
    sending (303), by the server (S), the e-permit for starting work to the first mobile device,
    in response to receiving the e-permit, the first mobile device monitoring (305) its position status periodically based on a signal strength of the signal from the radio beacon as received by the first mobile device, and sending the result to the server (S), wherein, on the basis of the signal strength, the first mobile device indicating it is one of present at the location of work, moved away from the location of work, and left the area of work, and generating a first alarm (AI) by the server (S) by applying measures selected from a group including: push notifications sent to mobile devices, SMS gate messages, voice calls to mobile devices, e-mail messages and triggering signaling devices, when a first criterion (CI) based on the position status of the first mobile device with respect to the location of work is met (CI) during the time between the start and the end of work indicating that first mobile device is away from the location of work, and the server surveilling (307) of the location of work in response to the server receiving an indication that the work is completed, including periodic determination of the position status by the first and second mobile devices based on the strength of the radio signal transmitted by the location beacon as received by the first and second mobile device and periodically sending the position statuses to the server (S) for a specified surveillance time of at least 60 minutes, and generating a second alarm (AII) by the server (S) by applying measures selected from a group including: push notifications sent to mobile devices (UE1, UE2, UE3), SMS gate messages, voice calls to mobile devices, e-mail messages and triggering signaling devices when, during the specified surveillance time after the end of work, a second criterion (CII) based on the position status of the first and second mobile devices (UE1, UE2) with respect to the location of work indicting that both the first and second mobile device have left the location of work.

2. The method according to claim 1, characterized in that the position status with respect to the location of work (L) is also determined using distance-based radio navigation at least a second radio beacon.

3. The method according to claim 1, characterized in that the first and/or the second alarm signal includes a message sent by the server to the first mobile device.

4. The method according to claim 1, characterized in that a unique graphical code with the encoded location of work (L) is provided at the location of work the method further comprises scanning the graphical code using the first mobile device, thus identifying (300) the location of work.

5. The method according to claim 1, wherein, the server, in processing the request for the e-permit, performs a verification step (501) to determine whether the location (L) of work is related to hazardous equipment with supply protection, the server further performs a protection verification step (502) to determine whether the location of work includes protection by padlocks with a normal key or a remote protection system, the server further blocking possibility of restoring a protected power supply at the location of work by sending a signal from server (S) when the remote protection system is available, the server further performing a verification step, in which it is checked that the power supply at the location of work is disconnected, and the server further performing the step of sending (505) a readiness notification signal to the first mobile device or the second mobile device.

6. The method according to claim 1, characterized in that the required surveillance time is coded in the request for the e-permit.

7. A surveillance system for work in a facility to minimize fire risk, comprising:

a server;

at least one radio beacon at a location of work, the at least one radio beacon repetitively transmitting a radio signal including an identifier of the at least one beacon and a coordinate location of the at least one beacon;

a first mobile device and a second mobile device, the first mobile device being associated with a first worker who is qualified to perform work using fire, the second mobile device being associated with a second worker, both the first and second mobile devices being configured to receive the radio signal transmitted by the radio beacon, and wherein the first and second mobile devices are in communication with the server via a communication network;

the first mobile device is configured to transmit to the server a request for an e-permit for starting work, the request including
an identity indication of the first worker,
an identity indication of the second worker,
an identification of work, including
start and end times of the work,
identification of the location of work, based on the location of the radio beacon as indicated in the signal transmitted by the radio beacon and received by the first mobile device, the server is configured to process the request and grant the e-permit when the request is complete and the server verifies that the first worker meets requirements for work with fire based on the identity indication of the first worker in the request, and, when the e-permit is granted, the server is configured to send the e-permit for starting work to the first mobile device, the first mobile device is configured, in response to the e-permit, monitor its position status periodically based on a signal strength of the signal from the radio beacon as received by the first mobile device, and send the result to the server, wherein, on the basis of the signal strength, the first mobile device indicates it is one of present at the location of work, moved away from the location of work, or left the area of work, the server is configured to generate a first alarm by applying measures selected from a group including: push notifications sent to mobile devices, SMS gate messages, voice calls to mobile devices, e-mail messages and triggering signaling devices, when a first criterion based on the position status of the first mobile device with respect to the location of work is met during the time between the start and the end of work indicating that first mobile device is away from the location of work, and the server is configured to surveille the location of work in response to the server receiving an indication that the work is completed, including periodic determination of the position status by the first and second mobile devices based on the strength of the radio signal transmitted by the location beacon as received by the first and second mobile device and periodically sending the position statuses to the server (S) for a specified surveillance time of at least 60 minutes; and the server is configures to generate a second alarm by applying measures selected from a group including:

push notifications sent to mobile devices, SMS gate messages, voice calls to mobile devices, e-mail messages and triggering signaling devices when, during the specified surveillance time after the end of work, a second criterion based on the position status of the first and second mobile devices with respect to the location of work indicting that both the first and second mobile device have left the location of work.

8. The system according to claim 7, wherein the system includes at least two radio beacons.

9. The system according to claim 8, wherein the system includes a set of beacons placed in a facility, near equipment covered by the performed work.

10. The system according to claim 9, wherein the system includes graphical codes located throughout the facility, with a coded identifier of their location in the facility.

11. A non-transitory computer program product containing a computer program that is adapted to installation in a memory of a mobile device (UE1, UE2, UE3), for minimizing risks of fires, the mobile device provided with a radio interface connected to a telecommunication network and with a radio interface adapted to receiving signals from radio beacons (IB, IB1, IB2, IB3), the application program being characterized in that once loaded into the memory of the mobile device (UE1, UE2, UE3), the computer program is adapted to:
  cause the mobile device to identify (300) a location of work in which the mobile device (UE1, UE2, UE3) is located by receiving the radio signals from the radio beacons which identify locations of each of the radio beacons,
  send (301) a request for an e-permit for starting work using the telecommunication network, the request including identity indication of a worker qualified to work requiring use of fire, the worker being associated with the first mobile device (UE1), the request also includes;
  an identification of work, including
    start and end time of the work,
    identification of the location of work,
  an identity of at least one other worker carrying a second mobile device (UE2),
  the computer program, when loaded in the memory of the mobile device, further causes the mobile device to receive an e-permit for the work;
  periodic determination of the computer program, when loaded in the memory of the mobile device, further causes the mobile device to, between the start and end time of the work, periodically determine the position status of the mobile device (UE1, UE2, UE3) in relation to the location of work, on the basis of a strength of the signals from radio beacons (IB, IB1, IB2, IB3), determine whether the position status of the mobile device is at the location of work, moved away from the location of work, or left the area of work, and send the position status to a server each time the position status is determined by the mobile device using the telecommunication network (N), and
  the computer program, when loaded in the memory of the mobile device, further causes the mobile device to receive an alarm signal from the server via the communication network.

* * * * *